(12) United States Patent
Bulea

(10) Patent No.: US 8,886,480 B2
(45) Date of Patent: Nov. 11, 2014

(54) SYSTEM AND METHOD FOR SIGNALING IN GRADIENT SENSOR DEVICES

(75) Inventor: Mihai Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 807 days.

(21) Appl. No.: 13/170,059

(22) Filed: Jun. 27, 2011

(65) Prior Publication Data

US 2012/0330590 A1 Dec. 27, 2012

(51) Int. Cl.
*G01R 25/00* (2006.01)
*G06F 3/044* (2006.01)

(52) U.S. Cl.
CPC ................................. *G06F 3/044* (2013.01)
USPC .......................................................... 702/65

(58) Field of Classification Search
None
See application file for complete search history.

(56) References Cited

U.S. PATENT DOCUMENTS

| | | | |
|---|---|---|---|
| 4,087,625 A | 5/1978 | Dym et al. |
| 5,650,597 A | 7/1997 | Redmayne |
| 5,841,078 A | 11/1998 | Miller et al. |
| 5,844,078 A | 12/1998 | Niddam et al. |
| 6,278,444 B1 | 8/2001 | Wilson et al. |
| 6,288,707 B1 | 9/2001 | Philipp |
| 6,879,930 B2 | 4/2005 | Sinclair et al. |
| 7,030,860 B1 | 4/2006 | Hsu et al. |
| 7,265,686 B2 | 9/2007 | Hurst |
| 7,355,592 B2 | 4/2008 | Hong et al. |
| 7,382,139 B2 | 6/2008 | Mackey |
| 7,423,635 B2 | 9/2008 | Taylor et al. |
| 7,737,953 B2 | 6/2010 | Mackey |
| 7,808,255 B2 | 10/2010 | Hristov et al. |
| 8,248,383 B2 | 8/2012 | Dews et al. |

(Continued)

OTHER PUBLICATIONS

ISA/KR "International Search Report and Written Opinion" mailed Apr. 28, 2011 for International Appln. No. PCT/US2010/048319.

(Continued)

*Primary Examiner* — Aditya Bhat
(74) *Attorney, Agent, or Firm* — Ingrassia Fisher & Lorenz P.C.

(57) ABSTRACT

A processing system includes a transmitter module, a receiver module, and a determination module. The transmitter module is configured to transmit in accordance with a first excitation mode with a transmitter electrode during a first interval and a third interval of a sensing frame period, wherein, during the first excitation mode, a first voltage variation is generated in the transmitter electrode. The transmitter module is further configured to transmit in accordance with a second excitation mode with the transmitter electrode during a second interval of the sensing frame, wherein, during the second excitation mode, a second voltage variation different from the first voltage variation is generated in the transmitter electrode. The receiver module is configured to receive a first resulting signal with a receiver electrode during the first interval, receive a second resulting signal with the receiver electrode during the second interval, and receive a third resulting signal with the receiver electrode during the third interval. The determination module is configured to compute a first measurement of a change in capacitive coupling between the transmitter electrode and the receiver electrode based on the first resulting signal, compute a second measurement of a change in capacitive coupling between the transmitter electrode and the receiver electrode based on the second resulting signal, compute a third measurement of a change in capacitive coupling between the transmitter electrode and the receiver electrode based on the third resulting signal, and combine the first and third measurements. The determination module is further configured to determine positional information for an input object based on the second measurement and a combination of the first and third measurements.

20 Claims, 5 Drawing Sheets

(56) References Cited

U.S. PATENT DOCUMENTS

| | | |
|---|---|---|
| 2004/0135775 A1 | 7/2004 | Hurst et al. |
| 2005/0012644 A1 | 1/2005 | Hurst et al. |
| 2006/0097991 A1* | 5/2006 | Hotelling et al. ............ 345/173 |
| 2007/0146349 A1 | 6/2007 | Errico |
| 2007/0222763 A1 | 9/2007 | Spath |
| 2007/0247443 A1 | 10/2007 | Philipp |
| 2007/0257894 A1 | 11/2007 | Philipp |
| 2008/0006453 A1 | 1/2008 | Hotelling |
| 2008/0246496 A1 | 10/2008 | Hristov et al. |
| 2009/0091551 A1 | 4/2009 | Hotelling et al. |
| 2009/0194344 A1 | 8/2009 | Harley et al. |
| 2009/0267914 A1 | 10/2009 | Dews et al. |
| 2009/0277696 A1 | 11/2009 | Reynolds et al. |
| 2009/0322355 A1 | 12/2009 | Day et al. |
| 2010/0007625 A1 | 1/2010 | Jiang et al. |
| 2010/0045632 A1 | 2/2010 | Yilmaz et al. |
| 2010/0164889 A1 | 7/2010 | Hristov |
| 2010/0214231 A1 | 8/2010 | D'Souza et al. |
| 2010/0258360 A1 | 10/2010 | Yilmaz |
| 2010/0328255 A1 | 12/2010 | Ishizaki et al. |
| 2011/0043478 A1 | 2/2011 | Matsushima |
| 2011/0048813 A1 | 3/2011 | Yilmaz |
| 2011/0062969 A1 | 3/2011 | Hargreaves et al. |
| 2011/0062974 A1 | 3/2011 | Day |

OTHER PUBLICATIONS

United States Patent and Trademark Office, Non-Final Office Action mailed Sep. 6, 2012 for U.S. Appl. No. 12/847,598.

United States Patent and Trademark Office, US Non-final Office Action for U.S. Appl. No. 12/879,474, dated Dec. 28, 2012.

USPTO, Ex parte Quayle Office Action for U.S. Appl. No. 12/879,474, mailed May 15, 2013.

\* cited by examiner

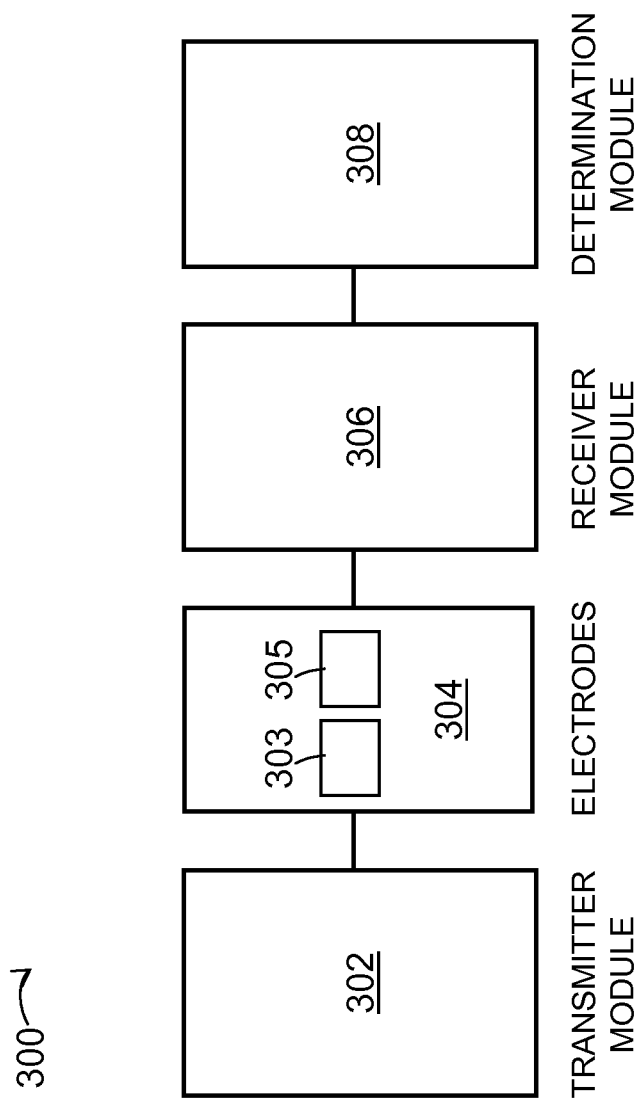

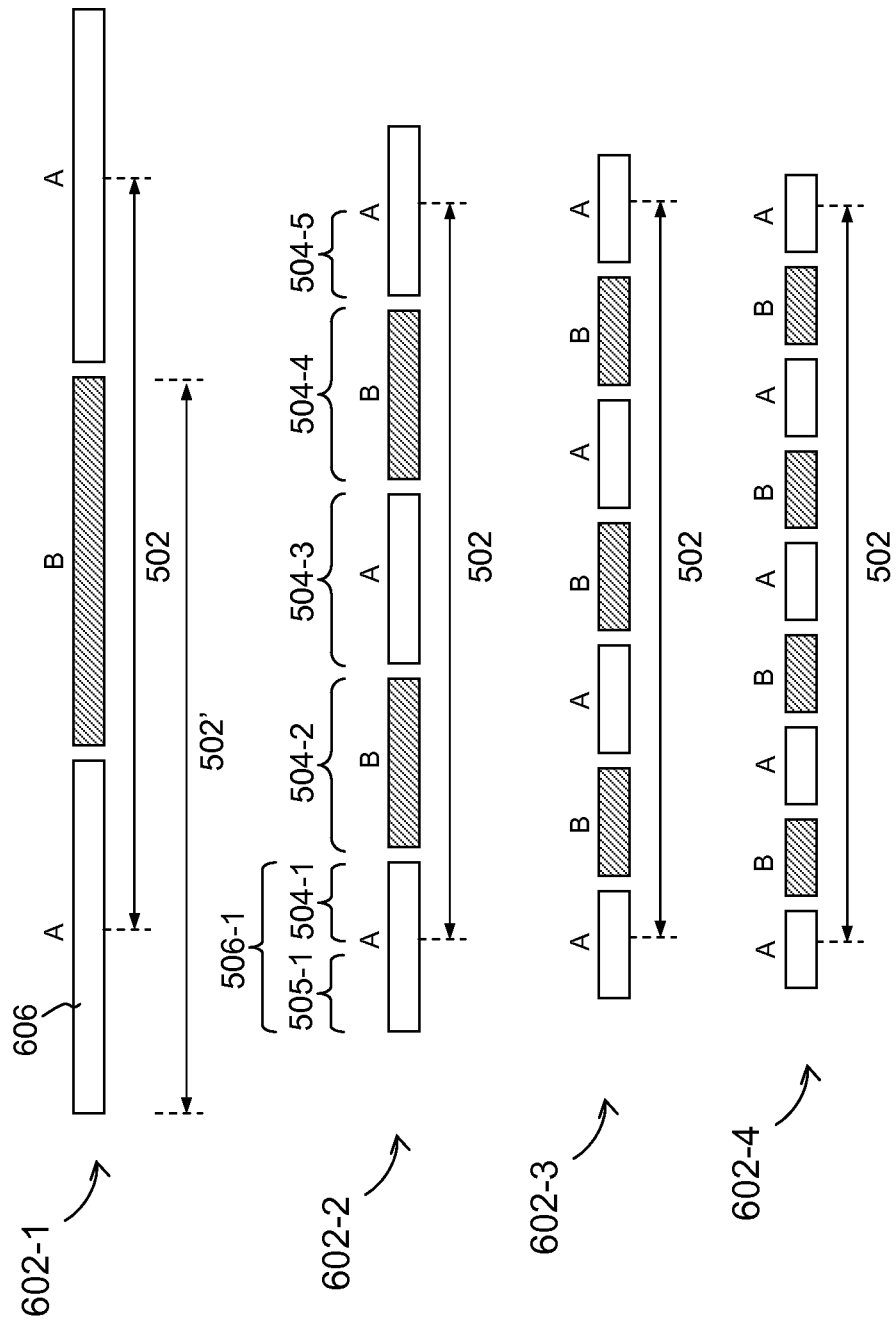

SYSTEM AND METHOD FOR SIGNALING IN GRADIENT SENSOR DEVICES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Gradient sensors are sensors that employ a voltage variation across one or more electrodes (usually a transmitter electrode) to assist in determining positional information. While gradient sensors are advantageous in a number of respects, the accuracy of reported coordinates in such sensors may be undesirable, particular during landing and removal of a finger or other object. This effect is often referred to as "tapping splatter." Accordingly, there is a need for improved gradient sensor systems and methods.

BRIEF SUMMARY OF THE INVENTION

A processing system in accordance with one embodiment of the present invention includes a transmitter module, a receiver module, and a determination module. The transmitter module comprises transmitter circuitry and the transmitter module is configured to transmit in accordance with a first excitation mode with a transmitter electrode during a first interval and a third interval of a sensing frame period, wherein, during the first excitation mode, a first voltage variation is generated in the transmitter electrode. The transmitter module is further configured to transmit in accordance with a second excitation mode with the transmitter electrode during a second interval of the sensing frame, wherein, during the second excitation mode, a second voltage variation different from the first voltage variation is generated in the transmitter electrode. The receiver module comprises receiver circuitry and the receiver module is configured to receive a first resulting signal with a receiver electrode during the first interval, receive a second resulting signal with the receiver electrode during the second interval, and receive a third resulting signal with the receiver electrode during the third interval. The determination module is configured to compute a first measurement of a change in capacitive coupling between the transmitter electrode and the receiver electrode based on the first resulting signal, compute a second measurement of a change in capacitive coupling between the transmitter electrode and the receiver electrode based on the second resulting signal, and compute a third measurement of a change in capacitive coupling between the transmitter electrode and the receiver electrode based on the third resulting signal. The determination module is further configured to determine positional information for an input object based on the second measurement and a combination of the first and third measurements.

A method of capacitive sensing in accordance with one embodiment includes transmitting in accordance with a first excitation mode with a transmitter electrode during a first interval and a third interval of a sensing frame period, wherein, during the first excitation mode, a first voltage variation is generated in the transmitter electrode; transmitting in accordance with a second excitation mode with the transmitter electrode during a second interval of the sensing frame period; wherein, during the second excitation mode, a second voltage variation different from the first voltage variation is generated in the transmitter electrode; receiving a first resulting signal with a receiver electrode during the first interval, receiving a second resulting signal with the receiver electrode during the second interval, and receiving a third resulting signal with the receiver electrode during the third interval; computing a first measurement of a change in capacitive coupling between the transmitter electrode and the receiver electrode based on the first resulting signal, computing a second measurement of a change in capacitive coupling between the transmitter electrode and the receiver electrode based on the second resulting signal, and computing a third measurement of a change in capacitive coupling between the transmitter electrode and the receiver electrode based on the third resulting signal; and determining positional information for an input object based on the second measurement and a combination of the first and third measurements.

A capacitive sensor device in accordance with one embodiment of the invention includes a first transmitter electrode, a receiver electrode, and a processing system communicatively coupled to the first transmitter electrode and receiver electrode. The processing system is configured to transmit in accordance with a first excitation mode with a transmitter electrode during a first interval and a third interval of a sensing frame period, wherein, during the first excitation mode, a first voltage variation is generated in the transmitter electrode; and transmit in accordance with a second excitation mode with the transmitter electrode during a second interval of the sensing frame period; wherein, during the second excitation mode, a second voltage variation different from the first voltage variation is generated in the transmitter electrode; receive a first resulting signal with a receiver electrode during the first interval, receiving a second resulting signal with the receiver electrode during the second interval, and receiving a third resulting signal with the receiver electrode during the third interval; compute a first measurement of a change in capacitive coupling between the transmitter electrode and the receiver electrode based on the first resulting signal, compute a second measurement of a change in capacitive coupling between the transmitter electrode and the receiver electrode based on the second resulting signal, and compute a third measurement of a change in capacitive coupling between the transmitter electrode and the receiver electrode based on the third resulting signal; and determine positional information for an input object based on the second measurement and a combination of the first and third measurements.

BRIEF DESCRIPTION OF DRAWINGS

The preferred exemplary embodiment of the present invention will hereinafter be described in conjunction with the appended drawings, where like designations denote like elements, and:

FIG. 3 is a conceptual block diagram depicting an exemplary embodiment of the present invention;

FIG. 6 depicts exemplary sensing frame patterns in accordance with various embodiments of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
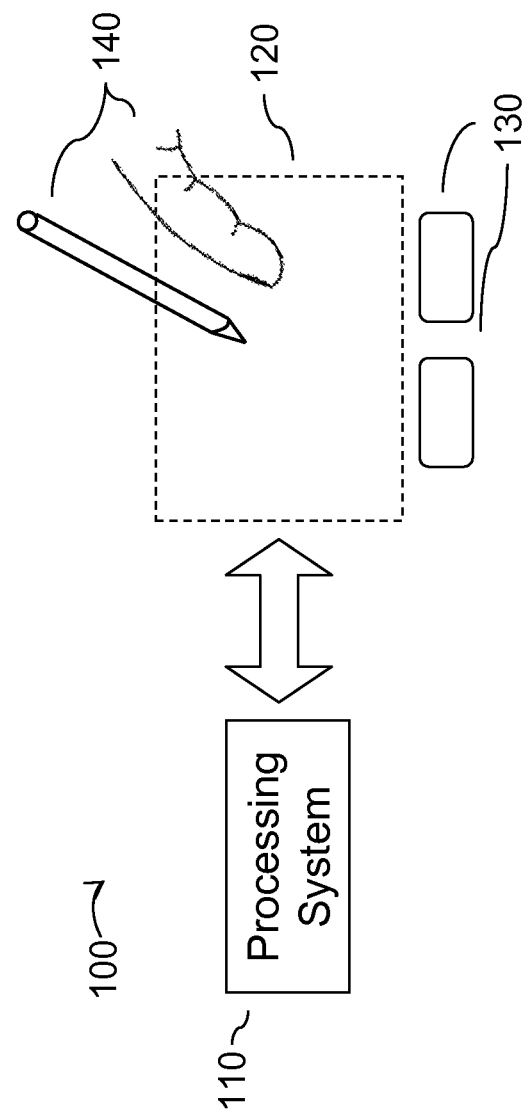
FIG. 1 is a block diagram of an exemplary system that includes an input device in accordance with an embodiment of the invention.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Figure 2:
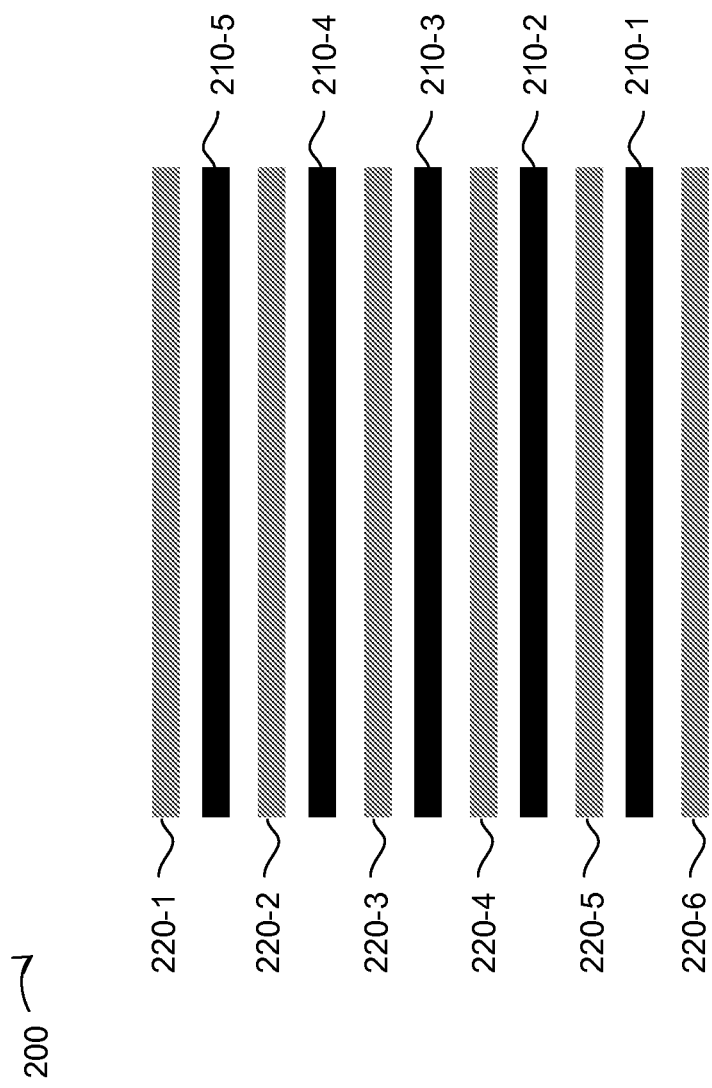
FIG. 2 depicts an exemplary sensor electrode pattern in accordance with various embodiments of the invention.

In this regard, FIG. 2 illustrates, conceptually, an exemplary set of capacitive sensor electrodes 200 configured to sense in a sensing region. For clarity of illustration and description, FIG. 2 shows a pattern of simple rectangles arranged substantially parallel to each other; however, it will be appreciated that the invention is not so limited, and that a variety of electrode patterns and shapes may be suitable in any particular embodiment. In some embodiments (as in the illustrated embodiment), electrodes 210 and electrodes 220 are configured substantially parallel to each other. In other embodiments, electrodes 210 and electrodes are substantially orthogonal or oriented at some other predefined angle with respect to each other. Sensor electrodes 210 and 220 are typically ohmically isolated from each other. In some embodiments, sensor electrodes 210 are separated from sensor electrodes by one or more substrates. For example, they may be disposed on opposite sides of the same substrate, or on different substrates that are laminated together.

In one embodiment, some sensor electrodes 210 are configured as receiver electrodes and some sensor electrodes 220 are configured as transmitter electrodes. The capacitive coupling between the transmitter electrodes and receiver electrodes change with the proximity and motion of input objects in the sensing region associated with the transmitter electrodes and receiver electrodes. The receiver sensor electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

In some embodiments, the transmitted signals are substantially orthogonal in terms of time, frequency, or the like—i.e., exhibit very low cross-correlation, as is known in the art. In this regard, two signals may be considered substantially orthogonal even when those signals do not exhibit strict, zero cross-correlation. In a particular embodiment, for example, the transmitted signals include pseudo-random sequence codes. In other embodiments, Walsh codes, Gold codes, or another appropriate quasi-orthogonal or orthogonal codes are used.

Referring again to FIG. 1, a processing system 110 is shown as part of the input device 100. The processing system 110 is configured to operate the hardware of the input device 100 (including, for example, the various sensor electrodes 200 of FIG. 2) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Referring now to the conceptual block diagram depicted in FIG. 3, various embodiments of an exemplary processing system 110 as shown in FIG. 1 may include a system 300. System 300, as illustrated, generally includes transmitter module 302 communicatively coupled via a set of electrodes (or simply "electrodes") 304 to receiver module 306, which itself is coupled to determination module 308. Electrodes 304 include one or more transmitter electrodes 303 and one or more receiver electrodes 305. In one embodiment, electrodes 304 may be constructed from opaque or substantially opaque conductive materials. In other embodiments electrodes 304 can be constructed from transparent or substantially transparent conductive material, such as patterned ITO, ATO, carbon fiber nanotubes, or other substantially transparent materials. In one embodiment, transmitter electrodes 303 are constructed from a conductive material of substantially uniform resistivity, so that voltage variations can be imposed on it by the driving methods described below. In some embodiments, the conductive material may have non-uniform resistivity, such as having a higher or lower resistivity on the distal ends than in the middle portion. Other forms of non-uniform resistivity can also be accommodated. In one embodiment, the voltage variations may be defined as the amount of change in voltage as a function of a small change in position along a transmitter electrode comprising resistive material.

Transmitter module 302 includes any combination of hardware and/or software configured to transmit in accordance with one or more excitation modes with transmitter electrodes 303. In one embodiment, transmitter module 302 comprises transmitter circuitry. In another embodiment, and as described in further detail below, transmitter module 302 is configured to operate during sensing frame periods that are partitioned into multiple intervals, wherein, during each interval of a sensing frame period, the transmitter transmits in accordance with a particular excitation mode.

Receiver module 306 includes any combination of hardware and/or software configured to receive resulting signals with receiver electrodes 305. In one embodiment, receiver module 306 comprises receiver circuitry. As described above, a resulting signal will generally comprise effects corresponding to the excitation modes in which transmitter electrodes 303 are transmitting, and/or to one or more sources of environmental interference.

Determination module 308 includes any combination of hardware and/or software configured to compute measurements of changes in capacitive coupling between one or more transmitter electrodes 303 and one or more receiver electrodes 305 based on the resulting signals, and then determine positional information based on the measurements and/or one or more combinations of those measurements. Determination module 308 is configured to combine measurements of capacitive coupling changes in any suitable manner. For example, in one embodiment, determination module 308 is configured to compute a first measurement of a change in capacitive coupling between a transmitter electrode 303 and a receiver electrode 305 based on a first resulting signal, compute a second measurement of a change in capacitive coupling between the transmitter electrode 303 and the receiver electrode 305 based on the second resulting signal, and compute a third measurement of a change in capacitive coupling between the transmitter electrode 303 and the receiver electrode 305 based on the third resulting signal. As described in further detail below, the first and third measurements may be associated with partial clusters transmitted during first and last intervals of a sensing frame.

Figure 4:
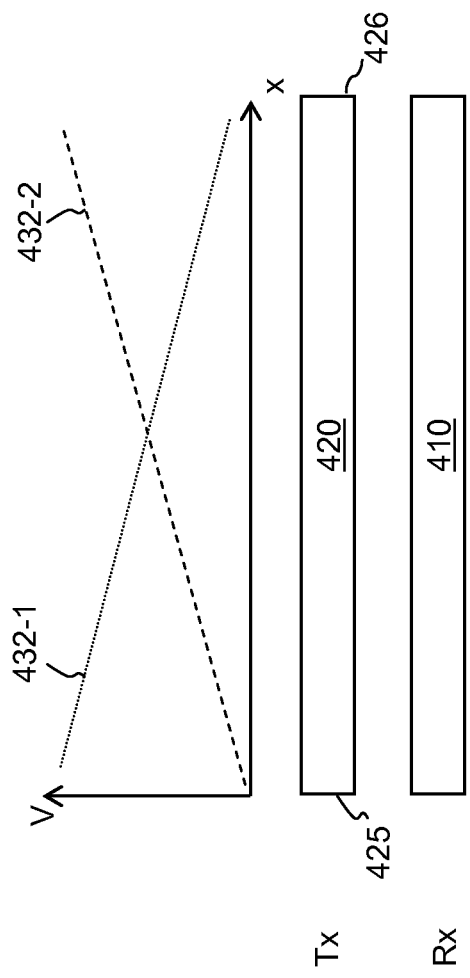
FIG. 4 is a conceptual diagram depicting operation of exemplary electrodes in accordance with one embodiment of the invention.

In accordance with various embodiments of the invention, transmitter module 302 is configured to transmit in accordance with various excitation modes during sensing frame periods that are partitioned into multiple intervals. In this regard, FIG. 4 depicts a transmitter electrode 420 and a receiver electrode 410, wherein the transmitter module 302 of FIG. 3 is configured to transmit in accordance with an excitation mode with transmitter electrode 420, and the receiver module 306 of FIG. 3 is configured to receive resulting signals associated therewith. In the illustrated embodiment, transmitter electrode 420 and receiver electrode 410 are illustrated as generally rectangular and oriented substantially parallel to each other. However, as mentioned above, transmitter electrodes 420 and receiver electrodes 410 may have a variety of shapes and relative orientations.

FIG. 4 also includes a graphical depiction of multiple excitation modes, wherein the x axis corresponds to a distance along transmitter electrode 420, and the y axis corresponds to a voltage (V) generated in transmitter electrode 420. Thus, each excitation mode may be characterized by a corresponding voltage variation 432—for example, a first voltage variation 432-1, and a second voltage variation 432-2—extending from a first end 425 of transmitter electrode 420 (i.e., at x=0) to a second end 426 of transmitter electrode 420 (i.e., at some non-zero value of x). Voltage variations 432-1 and 432-2 are different in some respect. For example, voltage variations 432 may have different slopes or curvature, different minimum or maximum values, different polarities, different amplitudes, and/or the like. As depicted in FIG. 4, for example, voltage variations 432 may have different gradients (i.e., different continuous, monotonic increase or decrease in voltage). In this regard, the term "gradient sensor" is used without loss of generality to refer to a sensor device employing voltage variations as described herein.

For simplicity, voltage variations 432 are depicted as linear functions in FIG. 4; however, the invention is not so limited. Voltage variations 432 may be linear, non-linear, piecewise linear, smooth (differentiable), non-smooth, or be characterized by any other desired mathematical function. In further embodiments, voltage variations 432 are monotonic. In one embodiment, as illustrated, voltage variation 432-1 decreases from the first end 425 to the second end 426 of transmitter electrode 420 (i.e., V is inversely related to x), and voltage variation 432-2 increases from the first end 425 to the second end 426 of transmitter electrode 420 (i.e., V is directly related to x).

In order to produce voltage variations 432 in accordance with the desired excitation modes, transmitter module 302 is configured to be coupled to one or more ends 425 and 426 of transmitter electrode 420 such that end 425 and/or end 426 may be driven by transmitter module 302. As used herein, "driving" a signal with respect to a particular end of a transmitter electrode refers to imparting or otherwise causing a series of bursts, pulses or voltage transitions for a period of time. In embodiments that include multiple transmitter electrodes, each end of those electrodes may be commonly or individually driven. Thus, for example, a first end of at least two transmitter electrodes may be configured to be driven simultaneously, while a second end of the at least two transmitter electrodes may be configured to be driven individually.

In accordance with one example excitation mode, a first end of transmitter electrode 420 (either end 425 or end 426) is driven with a signal (e.g., a plurality of pulses or voltage transitions), while a second end is driven with ground or driven with another suitable constant voltage. In accordance with another example excitation mode, a first end of transmitter electrode 420 is driven with a signal, while a second end is allowed to electrically float. In accordance with another example excitation mode, a first end and a second end of transmitter electrode 420 are driven with the same signal. In accordance with another example excitation mode, a first end of electrode 420 is driven with a first signal while a second end is driven with a second signal, wherein the first and second signals are different in some respect. In one embodiment, the first and second signals may be different in at least one of amplitude, polarity, frequency, and phase. While many different combinations of excitation modes may be used to generate the different first and second voltage variations 432 described above, in one embodiment, the excitation modes are selected to be generally non-proportional to each other. For example, if a first excitation mode comprises allowing one end 425 or 426 to electrically float, then during the second excitation mode that end of transmitter electrode 420 is either driven with a signal or a constant voltage. Similarly, if a first excitation mode and a second excitation mode comprise driving ends 425 and 426 with different signals, it is advantageous that those signals create different, non-proportional voltage gradients.

Figure 5:
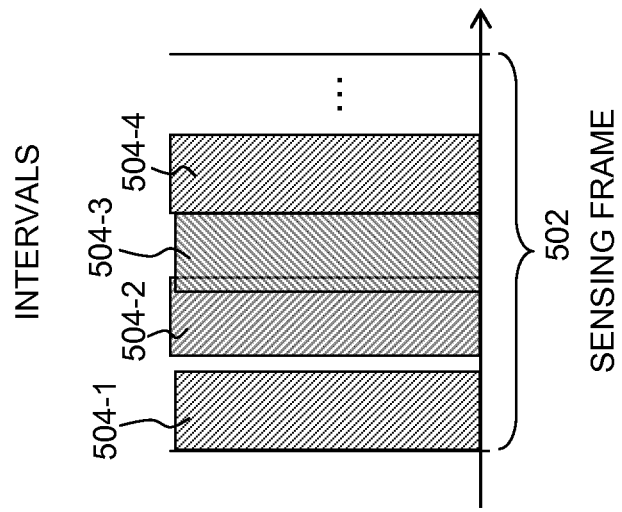
FIG. 5 is a conceptual diagram of a sensing frame in accordance with one embodiment of the invention.

Referring now to FIG. 5 in conjunction with FIG. 4, the excitation modes depicted in FIG. 4 may be transmitted during different intervals 504 of a sensing frame period 502. For example, voltage variation 432-1 may be generated in transmitter electrode 420 during interval 504-1, and voltage variation 432-2 may be generated in transmitter electrode 420 during interval 504-2. FIG. 5 depicts four exemplary intervals; however, sensing frame period 502 may comprise any number of intervals, as described in further detail below.

Intervals 504 may be overlapping (e.g., intervals 504-2 and 504-3) or non-overlapping (e.g., intervals 504-1 and 504-2). Moreover, intervals 504 may be substantially equal (i.e., equal in duration) or have different durations. In a particular embodiment, voltage variation 432-1 is generated in transmitter electrode 420 during a first interval 504, voltage variation 432-2 is generated in transmitter electrode 420 during a second interval 504, and a 432-1 is again generated in transmitter electrode 420 during a third interval. In one embodiment, the first, second, and third intervals are non-overlapping, and the first interval occurs after the first interval and before the third interval. In a further embodiment, voltage variation 432-2 is again generated in transmitter electrode 420 during a fourth interval 504 that is subsequent to and non-overlapping with the third interval 504.

In one embodiment, the first, second, and third intervals 504 are equal in duration. In another embodiment, the second and third interval are substantially equal, and the first interval is shorter than the second interval. In yet another embodiment, the first and third intervals are substantially equal, and the second interval is longer than the first interval. The intervals may have any suitable duration. In one embodiment, for example, an interval 504 is approximately 10-15 ms in duration. In particular embodiment, an interval 504 is 12 ms in duration.

FIG. 6 depicts, conceptually, a variety of example excitation mode sequences (or simply "sequences") 602 useful in understanding the present invention. As shown, each sequence 602 has a sensing frame period 502 (or 502') in which, at various times, a first excitation mode (labeled "A") and a second excitation mode (labeled "B") are employed. Each excitation mode may include one or more "bursts" of pulses or voltage transitions (not individually illustrated) for a period of time and be grouped into discrete "clusters" 606. The length of clusters 606 may be equal or may vary. In one embodiment, each cluster 606 includes one or more intervals 504 of the type depicted in FIG. 5. For clarity, each cluster 606 is illustrated with a gap between itself and an adjacent cluster; however, as mentioned above in connection with FIG. 5, the invention is not so limited.

In one embodiment, each sensing frame period 502 spans two or more clusters 606, wherein each sensing frame period 502 begins and ends within a cluster 606 (e.g., in the center of a cluster) corresponding to an A excitation mode. Thus, sequence 602-1 spans two clusters 606, sequence 602-2 spans four clusters 606, sequence 602-3 spans six clusters 606, and sequence 602-4 spans eight clusters 606. It is not required, however, that a sensing frame period 502 span an even number of clusters 606. In other embodiments, the sensing frame (e.g., sensing frame period 502') begins and/or ends at the beginning and/or end a cluster 606. In one embodiment, sensing frame period 502 may begin and end at any point of a cluster, creating intervals of differing lengths. In various embodiments, the intervals that are the beginning and ending of a sensing frame, may combine to create a complete cluster. For example, in a first embodiment, sensing frame period 502 may begin with a first interval that is a quarter of a cluster corresponding to excitation mode A and end with a second interval that is three quarters of a cluster corresponding to excitation mode A. In another embodiment, sensing frame period 502 may begin with a first interval that is two thirds of a cluster corresponding to excitation mode A and end with a second interval that is a third of a second cluster corresponding to excitation mode A.

If complete clusters 606 are referred to A and B, and partial clusters (e.g., half clusters) are referred to as a and b, then the sensing frame of sequence 602-1 can be said to have the form aBa. Similarly, the sensing frame of sequences 602-2 through 602-4 can be said to have the form aBABa, aBABABa, and aBABABABa, respectively. In some embodiments, the clusters have a symmetrical form (i.e., are palindromic as in 'aBa', etc., as illustrated in FIG. 6). In other embodiments, the clusters have an asymmetrical form. In the illustrated embodiment, the A and B excitation modes are alternated (or interleaved). This interleaving, which results in the use of a greater number of clusters, but a lower number of bursts per cluster, has an averaging affect with respect to the measurements used to determine positional information, particularly during landing and finger removal. At the same time, an "offset" (i.e., an offset in time from the beginning of a sensing frame) is provided by the partial clusters. In one embodiment, an offset corresponds to the portion of a cluster not included within the sensing frame period. For example, a portion of cluster 506-1 corresponding to interval 504-1 is included within the sensing frame period of sequence 602-2. The portion not included within the sensing frame period corresponds to the offset, offset 505-1.

Referring to exemplary sequence 602-2, it can be seen that a partial cluster a is transmitted during interval 504-1, full clusters B, A, and B are transmitted during intervals 504-2 through 504-4, and a partial cluster a is transmitted during interval 504-5. Thus, interval 504-1 is equal in duration to interval 504-5, and less than interval 504-2. By combining the a clusters from intervals 504-1 and 504-5, a full cluster A may be formed (i.e., a+a) and then used by determination module 308 and determination circuitry 310 (of FIG. 3) to compute measurements of changes in capacitive coupling and determine positional information as described above. In one embodiment, the data is combined from the partial a clusters from intervals 504-1 and 504-5. In another embodiment, the measurements of changes in capacitive coupling determined during each partial a cluster from intervals 504-1 and 504-5 are combined. In one embodiment, interval 504-1 may be longer than interval 504-5. In another embodiment, interval 504-1 may be shorter than interval 504-5. In either embodiment, a full cluster may still be formed by combining interval 504-1 and 504-5. In further embodiments, the lengths of the intervals 504 may vary from sensing frame to sensing frame.

Thus, by interleaving multiple clusters (A, B, A, etc.), and adding an offset by virtue of the partial clusters (a), tapping splatter associated with gradient sensors can be significantly reduced. As a result, the accuracy of reported positional information, particularly during landing and finger removal, can be improved.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:

a transmitter module comprising transmitter circuitry, the transmitter module configured to:
transmit in accordance with a first excitation mode with a transmitter electrode during a first interval and a third interval of a sensing frame period, wherein, during the first excitation mode, a first voltage variation is generated in the transmitter electrode; and
transmit in accordance with a second excitation mode with the transmitter electrode during a second interval of the sensing frame; wherein, during the second excitation mode, a second voltage variation different from the first voltage variation is generated in the transmitter electrode;

a receiver module comprising receiver circuitry, the receiver module configured to receive a first resulting signal with a receiver electrode during the first interval, receive a second resulting signal with the receiver electrode during the second interval, and receive a third resulting signal with the receiver electrode during the third interval;

a determination module comprising determination circuitry, the determination module configured to compute a first measurement of a change in capacitive coupling between the transmitter electrode and the receiver electrode based on the first resulting signal, compute a second measurement of a change in capacitive coupling between the transmitter electrode and the receiver electrode based on the second resulting signal, compute a third measurement of a change in capacitive coupling between the transmitter electrode and the receiver electrode based on the third resulting signal, and determine positional information for an input object based on the second measurement and a combination of the first and third measurements.

2. The processing system of claim 1, wherein the first, second and third intervals are non-overlapping, and wherein the second interval occurs after the first interval and before the third interval.

3. The processing system of claim 1, wherein the transmitter electrode has a first end and a second end, and wherein the first voltage variation decreases from the first end to the second end and the second voltage variation decreases from the second end to the first end.

4. The processing system of claim 1, wherein the transmitter module is further configured to transmit in accordance with the second excitation mode during a fourth interval of the sensing frame period.

5. The processing system of claim 1, wherein the second interval and the third interval are substantially equal, and wherein the first interval is shorter than the second interval.

6. The processing system of claim 1, wherein the first interval and the third interval are substantially equal, and wherein the second interval is longer than the first interval.

7. The processing system of claim 1, wherein the first interval, second interval, and the third interval are substantially equal.

8. A method of capacitive sensing, the method comprising:
transmitting in accordance with a first excitation mode with a transmitter electrode during a first interval and a third interval of a sensing frame period, wherein, during the first excitation mode, a first voltage variation is generated in the transmitter electrode;
transmitting in accordance with a second excitation mode with the transmitter electrode during a second interval of the sensing frame period; wherein, during the second excitation mode, a second voltage variation different from the first voltage variation is generated in the transmitter electrode;
receiving a first resulting signal with a receiver electrode during the first interval, receiving a second resulting signal with the receiver electrode during the second interval, and receiving a third resulting signal with the receiver electrode during the third interval;
determining positional information for an input object by computing a first measurement of a change in capacitive coupling between the transmitter electrode and the receiver electrode based on the first resulting signal, computing a second measurement of a change in capacitive coupling between the transmitter electrode and the receiver electrode based on the second resulting signal, and computing a third measurement of a change in capacitive coupling between the transmitter electrode and the receiver electrode based on the third resulting signal, determining the positional information based on the second measurement and a combination of the first and third measurements.

9. The method of claim 8, further comprising transmitting in accordance with the second excitation mode during a fourth interval of the sensing frame.

10. The method of claim 8, further comprising receiving a fourth resulting signal with a second receiver electrode during at least one of the first interval, the second interval, and the third interval.

11. The method of claim 8, wherein the first, second, and third intervals are non-overlapping, and wherein the second interval occurs after the first interval and before the third interval.

12. The method of claim 8, wherein the second interval and the third interval are substantially equal, and wherein the first interval is shorter than the second interval.

13. The method of claim 8, wherein the first interval and the third interval are substantially equal, and wherein the second interval is longer than the first interval.

14. The method of claim 8, wherein the first interval, second interval, and the third interval are substantially equal.

15. A capacitive sensor device comprising:
a first transmitter electrode;
a receiver electrode; and
a processing system communicatively coupled to the first transmitter electrode and the receiver electrode, the processing system configured to:
transmit in accordance with a first excitation mode with a transmitter electrode during a first interval and a third interval of a sensing frame period, wherein, during the first excitation mode, a first voltage variation is generated in the transmitter electrode; and
transmit in accordance with a second excitation mode with the transmitter electrode during a second interval of the sensing frame period; wherein, during the second excitation mode, a second voltage variation different from the first voltage variation is generated in the transmitter electrode;
receive a first resulting signal with the receiver electrode during the first interval, receiving a second resulting signal with the receiver electrode during the second interval, and receiving a third resulting signal with the receiver electrode during the third interval;
compute a first measurement of a change in capacitive coupling between the transmitter electrode and the receiver electrode based on the first resulting signal, compute a second measurement of a change in capacitive coupling between the transmitter electrode and the receiver electrode based on the second resulting signal, and compute a third measurement of a change in capacitive coupling between the transmitter electrode and the receiver electrode based on the third resulting signal; and
determine positional information for an input object based on the second measurement and a combination of the first and third measurements.

16. The capacitive sensor device of claim 15, wherein the transmitter electrode has a first end and a second end, and wherein the first voltage variation decreases from the first end to the second end, and the second voltage variation decreases from the second end to the first end.

17. The capacitive sensor device of claim 15, wherein the first interval is less than the second interval, and wherein the third interval is substantially equal to either the first interval or the second interval.

18. The capacitive sensor device of claim 15, wherein the first interval, the second interval, and the third interval are substantially equal.

19. The capacitive sensor device of claim 15, wherein the transmitter electrode is disposed substantially parallel to the receiver electrode.

20. The capacitive sensor device of claim 15, further including a second receiver electrode, wherein the processing system is configured to receive a fourth resulting signal with the second receiver electrode during at least one of the first interval, the second interval, and the third interval.

* * * * *